May 9, 1950     G. E. DATH     2,506,707
FRICTION SHOCK ABSORBING MECHANISM
Filed Sept. 23, 1943
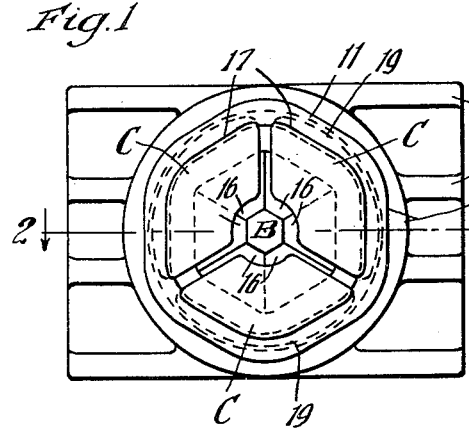
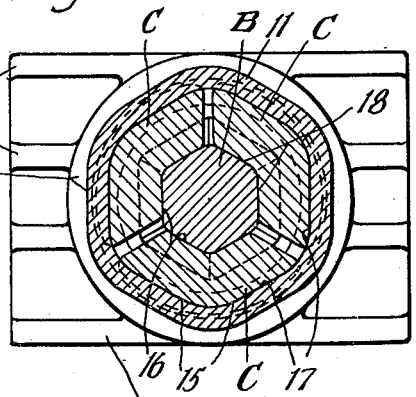
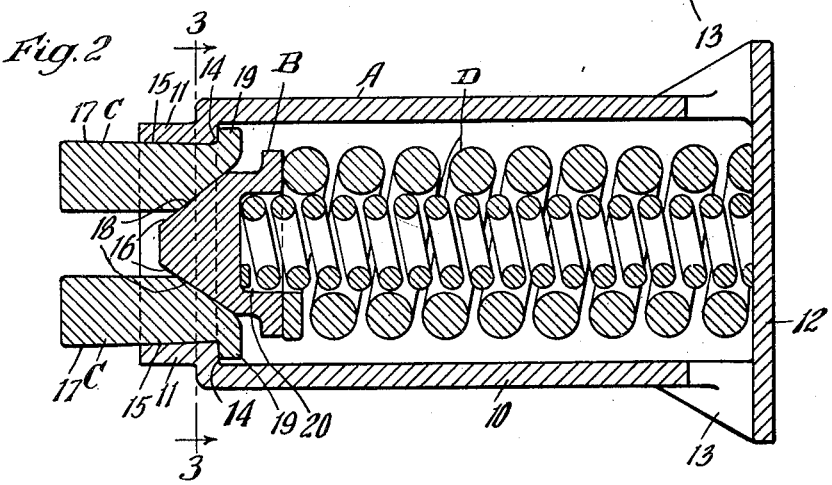
Inventor
George E. Dath
By Henry Fuchs, Atty.

Patented May 9, 1950

2,506,707

UNITED STATES PATENT OFFICE 2,506,707

FRICTION SHOCK ABSORBING MECHANISM

George E. Dath, Chicago, Ill., assignor to W. H. Miner, Inc., Chicago, Ill., a corporation of Delaware Application September 23, 1943, Serial No. 503,486

4 Claims. (Cl. 213—34)

This invention relates to improvements in friction shock absorbing mechanisms.

One object of the invention is to provide a friction shock absorbing mechanism, especially adapted for railway draft riggings, comprising a friction casing closed at one end and having the other end open, a friction clutch including a central combined wedge and spring follower and friction shoes surrounding said combined wedge and follower and having wedging engagement therewith and sliding frictional engagement with the interior walls of the casing, and spring resistance means within the casing opposing inward movement of the clutch, wherein all of the parts are insertable through the open end of the casing and are held assembled with the casing by shouldered engagement between the shoes and casing.

A more specific object of the invention is to provide a friction shock absorbing mechanism of the character described in the preceding paragraph wherein the means for holding the parts assembled comprises interior stop shoulders on the friction casing engaged by stop flanges on the friction shoes.

Other objects of the invention will more clearly appear from the description and claims hereinafter following.

In the drawing forming a part of this specification, Figure 1 is a front elevational view of a friction shock absorbing mechanism embodying my improvements. Figure 2 is a horizontal, longitudinal sectional view, corresponding substantially to the line 2—2 of Figure 1. Figure 3 is a transverse, vertical sectional view, corresponding substantially to the line 3—3 of Figure 2.

As shown in the drawing, my improved friction shock absorbing mechanism comprises broadly a casing A providing a combined friction shell and spring cage; a combined wedge and spring follower B; three friction shoes C—C—C; and a spring resistance D.

The casing A comprises a substantially cylindrical portion 10 forming the spring cage and a reduced front end portion 11 of hexagonal interior and exterior cross section of reduced size forming the friction shell portion. The casing A is closed at the rear end by a transverse vertical wall 12 which projects at opposite sides beyond the casing to provide a follower member of rectangualr outline, which is integral with the casing. The follower member is reinforced by webs 13—13 formed integral with the same and the casing walls. The reduced hexagonal friction shell section 11 where it joins the cylindrical portion 10 provides a laterally, inwardly directed, continuous stop shoulder 14 for a purpose hereinafter described.

The friction shell section 11 of the casing opens outwardly and is provided with six interior, substantially flat friction surfaces 15—15 which converge inwardly and are spaced symmetrically about the central longitudinal axis of the casing. The interior of the friction shell section thus presents six interior friction surfaces, adjacent surfaces of which are angularly disposed with reference to each other, thereby providing three pairs of surfaces, the adjacent members of each pair together forming a friction face of V-shaped transverse cross section.

The combined wedge and spring follower B is in the form of a heavy block, the rear portion of which is of cylindrical shape and is provided with an annular outstanding flange. The front portion of the block B is provided with three rearwardly diverging wedge faces 16—16—16 of V-shaped transverse cross section, each V-shaped face comprising two substantially flat surfaces disposed at an angle to each other. The V-shaped wedge faces are arranged symmetrically about the central longitudinal axis of the casing and have wedging engagement with the inner ends of the shoes.

The friction shoes C, which are preferably three in number, are interposed between the wedge B and the interior friction surfaces 15 of the casing. Each shoe has a friction surface 17 on the outer side thereof of V-shaped transverse cross section which cooperates with the corresponding V-shaped friction face of the casing formed by two adjacent surfaces 15—15.

On the inner side, that is, the side nearest the central axis of the mechanism, each shoe has a wedge face 18 of V-shaped transverse cross section at the inner end thereof, correspondingly inclined to and engaging with one of the V-shaped wedge faces 16 of the combined wedge and spring follower B. As shown in Figure 2, the shoes C—C—C project outwardly beyond the front end of the friction shell and are adapted to receive the actuating force.

Each shoe has a laterally, outwardly projecting flange 19 at the rear end thereof adapted to engage in back of the shoulder 14 of the casing to limit outward movement of the shoe and thus serve to hold the mechanism assembled.

Sufficient clearance is provided between adjacent shoes of the set or group to permit insertion of the set of shoes as a unit through the open front end of the casing with the flanges thereof clearing the interior walls of the friction shell section.

The spring resistance D comprises a relatively light inner coil and a heavier outer coil interposed between the combined wedge and spring follower B and the rear wall 12 of the casing. As shown in Figure 2, the combined wedge and spring follower is preferably provided with a seat 20 into which the front end of the inner coil of the spring extends.

In assembling the mechanism, the spring resistance D and the combined wedge and spring follower B are first placed within the casing A by insertion of the parts through the open front end of the casing. With the casing standing on end, the combined wedge and spring follower is forced inwardly by a bar or similar tool compressing the spring resistance D, until sufficient clearance is provided to permit insertion of the shoes into the casing without interference by the wedge and allow engagement of the flanges 19 thereof in back of the shoulder 14 of the casing. While the mechanism is thus held compressed, the shoes are inserted in a group, as a unit, the unit being contracted so that the flanges 19 of the shoes will freely pass through the contracted friction shell section 11 of the casing. The shoes are then spread apart to engage the flanges 19 thereof in back of the shoulder 14 of the casing. The pressure is then removed from the combined wedge and spring follower, permitting the mechanism to expand, thereby bringing the wedge portion of the combined wedge and follower B into forcible engagement with the shoes. The spreading action of the wedge under the influence of the springs, which, as hereinbefore pointed out, are under initial compression, maintains the shoes spread apart and in shouldered engagement with the limiting stop shoulder 14 of the casing.

The operation of my improved shock absorbing mechanism is as follows: Upon inward movement of the shoes C—C—C with respect to the casing A being produced due to compression of the mechanism, the former are spread apart by forcible engagement with the wedge portion of the spring resisted combined wedge and follower B, thereby forcing the friction surfaces of the shoes into tight frictional engagement with the friction surfaces of the casing. During inward movement of the shoes on the friction surfaces of the casing, high frictional resistance will be produced to absorb shocks. Due to the taper of the friction shell section 11 of the casing A, the shoes will be displaced inwardly toward the central longitudinal axis of the casing during said inward movement of the shoes along the friction surfaces of the casing, thereby effecting differential action between the shoes and the combined wedge and spring follower. As will be evident, this differential action materially increases the shock absorbing capacity of the mechanism.

Upon the actuating force being reduced, the expansive action of the spring resistance D returns the parts to the normal full release position shown in Figure 2, outward movement of the shoes C—C—C being limited by shouldered engagement with the shoulder 14 of the casing A.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a tubular casing closed at one end and open at the other end, said casing being provided with interior friction surfaces at said open end; of an interior stop shoulder at the open end of said casing; a plurality of friction shoes arranged symmetrically around the longitudinal central axis of the mechanism and having frictional engagement respectively with the interior friction surfaces of the casing; lateral projections on said shoes engaging in back of the shoulder of the casing to limit outward movement of the shoes, said shoes being cut away on their inner sides to provide an open space therebetween centrally of the mechanism, said shoes having wedge faces on their inner sides at the rear ends thereof; a central combined wedge and spring follower engaged between said shoes and protruding into the open space between the same; wedge faces on said combined wedge and spring follower engaging the wedge faces of the shoes; and a spring within said casing bearing at opposite ends directly on said combined wedge and spring follower and closed end of the casing, the open space between said shoes rendering said combined wedge block and spring follower accessible during assembling of the mechanism to be held in position inwardly of the casing to clear the rear ends of the shoes and permit insertion thereof within the open end of the casing unobstructed by said combined wedge block and spring follower.

2. A method comprising the following steps of assembling a friction shock absorbing mechanism including a tubular casing closed at one end and open at the other end, said casing being provided with interior friction surfaces at said open end, an interior stop shoulder at the open end of the casing, a set of three friction shoes arranged symmetrically around the longitudinal central axis of the mechanism and having sliding frictional engagement respectively with the interior friction surfaces of the casing, said shoes having wedge faces on their inner sides at the rear ends thereof, lateral outward projections on said shoes engaging in back of the shoulder of the casing to limit outward movement of the shoes, a central combined wedge and spring follower having wedge faces in wedging engagement with the wedge faces of the shoes, and a spring within the casing extending from the combined wedge and spring follower to the closed end of the casing and having its opposite ends bearing directly on said combined wedge and spring follower and closed end of the casing: first, inserting said spring within the casing through the open end thereof; second, inserting the combined wedge and spring follower within the casing and forcing the same inwardly against said spring by a barlike tool engaged with said combined wedge and spring follower; third, inserting the shoes within the casing through the open end thereof, holding said shoes spaced apart to provide an open space therebetween to render said combined wedge and spring follower accessible by said barlike tool to be held in position inwardly of the open end of the casing, to permit insertion of the shoes within said open end of the casing unobstructed by said combined wedge and spring follower.

3. In a friction shock absorbing mechanism, the combination with a tubular casing open at one end and closed at the other end, said casing being provided with interior friction surfaces at the open end thereof; of interior stop shoulders at the open end of said casing; a spring resistance insertable through the open end of the casing, said spring, in its assembled condition within the casing, bearing on the closed end of the same; a central combined wedge and spring follower insertable through the open end of the casing into engagement with said spring resistance, said combined wedge and spring follower being movable inwardly of the casing against the resistance of said spring resistance in assembling the mechanism by means of a holding bar engaged with said combined wedge, said bar serving, during said assembling operation, to hold the wedge in position spaced a predetermined distance inwardly from the open end of the casing; a plurality of friction shoes insertable through the open end of the casing when the combined wedge and spring follower is held in said predetermined spaced position, said shoes being arranged symmetrically about the central longitudinal axis of the mechanism about said bar during application of the shoes to the casing, said shoes being cut away on their inner sides to provide an open space therebetween to accommodate said bar, said shoes having friction surfaces thereon engageable with the friction surfaces of the casing; and lateral projections on said shoes engageable in back of said shoulders of the casing to limit outward movement of the shoes, the spacing of said combined wedge and spring follower, with respect to said shoulders of the casing in said predetermined position of the combined wedge and spring follower, providing sufficient clearance to permit insertion of the shoes within the casing without contact with the combined wedge and spring follower to bring the projections of the shoes in back of the shoulders of the casing, said shoes having wedge faces on their inner sides at the rear end thereof engageable by said combined wedge and spring follower when the spring resistance is permitted to expand by withdrawal of said bar.

4. In a friction shock absorbing mechanism, the combination with a tubular casing closed at its rear end and open at the front end, said casing being provided with lengthwise extending, interior friction surfaces at said open end; of an interior stop shoulder at said open end, said stop shoulder being continuous around the casing; three friction shoes arranged symmetrically around the longitudinal central axis of the mechanism and having sliding frictional engagement respectively with the interior friction surfaces of the casing; lateral outward projections on said shoes engaging in back of the shoulder of the casing to limit outward movement of the shoes, said shoes being cut away on their inner sides to provide an open space therebetween centrally of the mechanism, said shoes having wedge faces on their inner sides at the rear ends thereof; a central combined wedge and spring follower rearwardly of the shoes, said combined wedge and spring follower having a wedge projection extending into the space between said shoes and having wedge faces engaged with the wedge faces of the shoes; and a spring within the casing bearing at opposite ends directly on said combined wedge and spring follower and closed end of the casing, the open space between said shoes being of a size to render said combined wedge and spring follower accessible during assembling of the mechanism to be held inwardly of the casing to an extent to clear the rear ends of the shoes and thus permit insertion thereof within the open end of the casing unobstructed by said combined wedge and spring follower, said combined wedge and spring follower, in the assembled condition of the mechanism, being pressed against said shoes to hold the same spread apart with the projections thereof engaged in back of the shoulder of the casing.

GEORGE E. DATH.

REFERENCES CITED

The following references are of record in the file of this patent:

UNITED STATES PATENTS

| Number | Name | Date |
|---|---|---|
| 1,308,099 | O'Conner | July 1, 1919 |
| 1,566,685 | O'Conner | Dec. 22, 1925 |
| 1,862,764 | O'Conner | June 14, 1932 |
| 2,023,000 | Barrows | Dec. 3, 1935 |
| 2,146,956 | Johnston | Feb. 14, 1939 |
| 2,335,847 | Dath | Dec. 7, 1943 |
| 2,410,152 | Dath | Oct. 29, 1946 |
| 2,414,222 | Dath | Jan. 14, 1947 |